United States Patent
Gupta et al.

(10) Patent No.: US 11,115,347 B2
(45) Date of Patent: Sep. 7, 2021

(54) DYNAMIC MONITORING AND MIGRATION OF APPLICATIONS

(71) Applicant: Hewlett Packard Enterprise Development LP, Houston, TX (US)

(72) Inventors: Gopal Gupta, Bangalore Karnataka (IN); Abhinesh Mishra, Bangalore Karnataka (IN); Shashidhara Seetharamaiah Ganesharao, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/931,588

(22) Filed: Jul. 17, 2020

(65) Prior Publication Data
US 2021/0112017 A1     Apr. 15, 2021

(30) Foreign Application Priority Data
Oct. 14, 2019   (IN) .............................. 201941041500

(51) Int. Cl.
*H04L 12/927*     (2013.01)
*H04L 12/26*      (2006.01)
(Continued)

(52) U.S. Cl.
CPC ............ *H04L 47/803* (2013.01); *H04L 43/08* (2013.01); *H04L 43/16* (2013.01); *H04L 45/121* (2013.01); *H04L 45/24* (2013.01); *H04L 47/22* (2013.01)

(58) Field of Classification Search
CPC . H04L 43/0876; H04L 43/0864; H04L 45/22; H04L 45/24; H04L 41/12; H04L 45/121; H04L 41/0893; H04L 47/22; H04L 47/2441; H04L 41/5067; H04L 41/5019; H04L 41/5096; H04L 47/803; H04L 12/927; H04L 43/16
See application file for complete search history.

(56) References Cited

U.S. PATENT DOCUMENTS 8,868,735 B2    10/2014  Wang et al.
10,873,533 B1 *  12/2020  Ismailsheriff ....... H04L 47/2441
(Continued)

OTHER PUBLICATIONS

Velocloud, VeloCloud Dynamic Multipath Optimization, https://technologyleadership.academy/wp-content/uploads/2019/08/SDWAN-velocloud-benefits-DynamicMultipathOptimization.pdf, pp. 1-13.*
(Continued)

*Primary Examiner* — Chirag R Patel
(74) *Attorney, Agent, or Firm* — Hewlett Packard Enterprise Patent Department

(57) ABSTRACT

An example branch gateway includes processing circuitry and a memory including instructions that cause the branch gateway to perform various functions. The various functions include determining a first uplink health threshold, determining a second uplink health threshold, calculating migration thresholds for a set of non-critical applications, determining that a QoS threshold of a critical application is likely to be imminently breached, selecting a least critical application, based on the migration threshold of the least critical application, and migrating the least critical application from the first uplink to a second uplink.

20 Claims, 5 Drawing Sheets

(51) Int. Cl.
    *H04L 12/815*    (2013.01)
    *H04L 12/707*    (2013.01)
    *H04L 12/727*    (2013.01)

(56) References Cited

U.S. PATENT DOCUMENTS

| | | |
|---|---|---|
| 2009/0144740 A1 | 6/2009 | Gao |
| 2016/0337212 A1 | 11/2016 | Shanks et al. |
| 2018/0302320 A1 | 10/2018 | Aranha et al. |
| 2020/0106699 A1* | 4/2020 | Chauhan .............. H04L 45/24 |
| 2020/0153701 A1* | 5/2020 | Mohan ............... H04L 47/2425 |
| 2021/0112008 A1* | 4/2021 | Rahouti .............. H04L 45/02 |

OTHER PUBLICATIONS

Configuring Policies for Dynamic Path Steering, pp. 1-2, Retrieved from the Internet Jun. 19, 2019 from URL: <help.central.arubanetworks.com/2.4.5/documentation/online_help/content/sd_wan/gateway_management/wan/dps.htm>.

Drive Digital Transformation with Application Intelligence for the WAN Edge, pp. 1-7, Retrieved from the Internet Jun. 19, 2019 from URL: <infovista.com/sd-wan>.

* cited by examiner

DYNAMIC MONITORING AND MIGRATION OF APPLICATIONS

BACKGROUND

A wide area network (WAN) may extend across multiple network sites (e.g. geographical, logical). Sites of the WAN are interconnected so that devices at one site can access resources at another site. In some topologies, many services and resources are installed at core sites (e.g. datacenters, headquarters), and many branch sites (e.g. regional offices, retail stores) connect client devices (e.g. laptops, smartphones, internet of things devices) to the WAN. These types of topologies are often used by enterprises in establishing their corporate network.

Each network site has its own local area network (LAN) that is connected to the other LANs of the other sites to form the WAN. Networking infrastructure, such as switches and routers are used to forward network traffic through each of the LANs, through the WAN as a whole, and between the WAN and the Internet. Each network site's LAN is connected to the wider network (e.g. to the WAN, to the Internet) through a gateway router. Branch gateways (BGs) connect branch sites to the wider network, and head-end gateways (also known as virtual internet gateways) connect core sites to the wider network.

Often, WANs are implemented using software defined wide area network (SD-WAN) technology. SD-WAN decouples (logically or physically) the control aspects of switching and routing from the physical routing of the network traffic. In some SD-WAN implementations, each gateway (BGs and head-end gateways) controls certain aspects of routing for their respective LAN, but a network orchestrator controls the overall switching and routing across the WAN.

In some branch sites, a BG includes multiple uplinks to the broader WAN. These uplinks may provide diversity across technology (e.g. MPLS versus DSL), provider, and geography (based on the provider's network). The uplinks also provide high availability (redundancy if a subset of the uplinks go down) and increased total bandwidth. In certain high availability topologies, known as active-active, all uplinks transport traffic between the branch LAN and the broader WAN. A technology known as dynamic path selection determines which data traffic is transported across which uplink.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Figure 1:
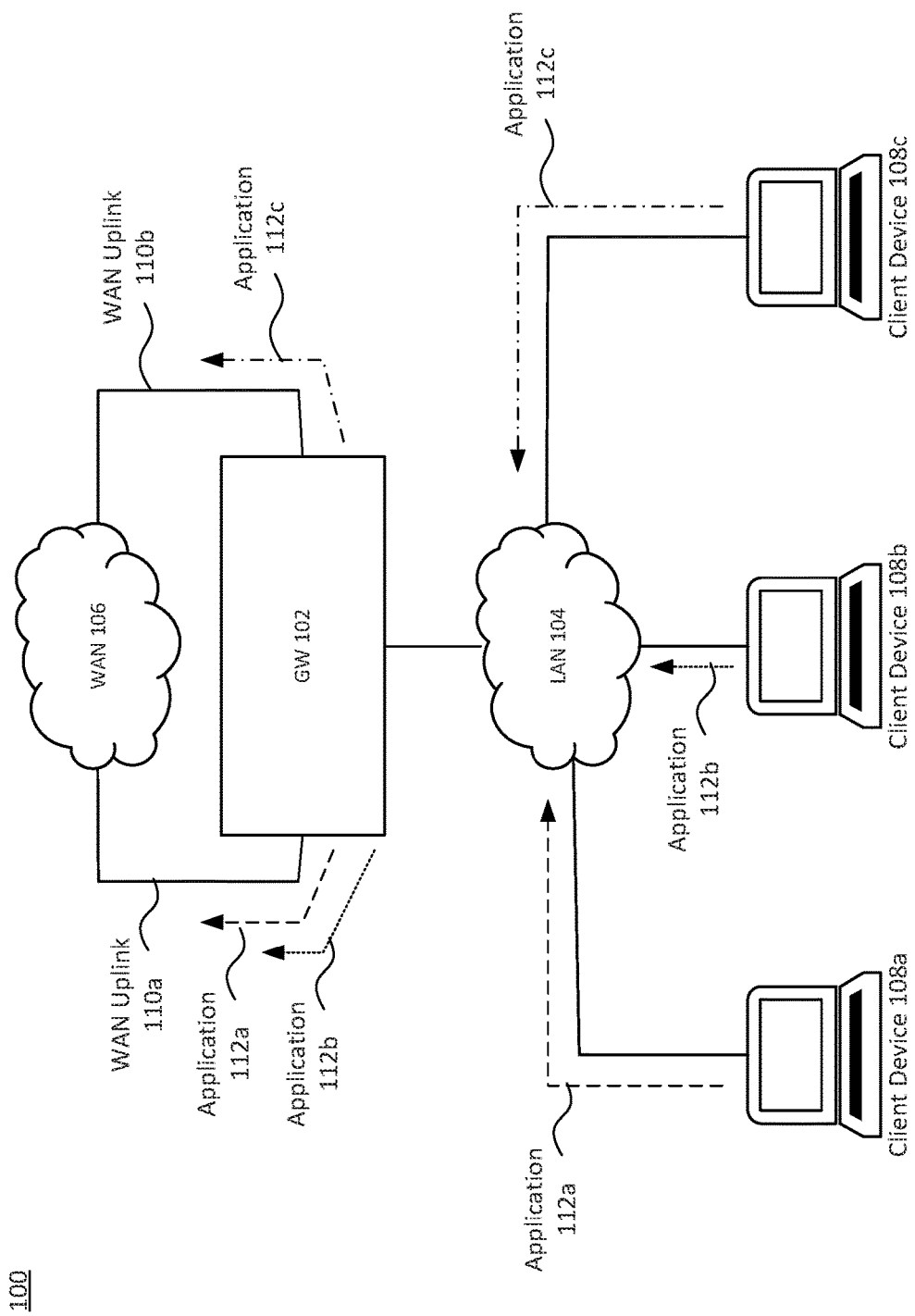
FIG. 1 illustrates an example software defined wide area network with a pair of wide area network (WAN) uplinks.

Certain examples have features that are in addition to or in lieu of the features illustrated in the above-referenced figures. Certain labels may be omitted from certain figures for the sake of clarity.

DETAILED DESCRIPTION

In certain examples, a branch gateway (BG) includes multiple uplinks to the wide area network (WAN) of the software defined wide area network (SD-WAN). These uplinks transceive data between devices of the branch local area network (LAN) and the WAN. The BG compares received packets to flows to determine which uplink to route certain data traffic through.

In examples including dynamic path selection (DPS), flows for each application transacting data on the network route the application's data through one or more of the uplinks. When network conditions change, the DPS algorithm re-evaluates the traffic on each uplink, and may migrate certain applications to another uplink to improve quality of service (QoS). Often, the DPS algorithm compares the current uplink health to a service level agreement (SLA) that describes minimum route health for good operation of the application. If the uplink is not healthy enough to meet an application's SLA, the application is migrated to a healthier uplink.

One difficulty of migrating applications between uplinks is that context may not be fully preserved, and there may be a downtime period when the application does not properly operate due to the migration. While this issue is not a concern for most applications, certain critical applications (e.g. video conferencing, voice over IP, etc.) may experience user-impacting reduction in QoS during a migration.

In some examples, applications are classified into two or more criticality classes based on application characteristics (e.g. reputation, sensitivity to network health, etc.). Applications in the most critical class are migrated when the respective application's SLA is violated. In certain examples, violation of any one parameter of the application's SLA is a violation of the SLA. In certain other examples, violation of a certain number of parameters of the application's SLA, up to all of the parameters, is required to violate the SLA. In some examples, violation of the application's SLA may include additional requirements, such as duration of violation of a parameter, magnitude of violation of parameters, etc.

In certain examples, Applications in less critical classes (also known as non-critical applications) are handled differently. A soft SLA is calculated for each criticality class using data collected from a variety of sources, including baseline uplink health information, minimum critical application SLA parameters, migration factors for each criticality class, and ongoing uplink health information.

In some examples, an initial operating range for non-critical applications is determined. The range is bounded by an uplink health baseline at the minimum and a minimum critical application SLA at the maximum. Then, for each less critical class, a migration threshold is set as a proportion of the determined initial operation range. For example, a least critical class may have a migration threshold set at 30% of the range, and a more critical class may have a migration threshold set at 80% of the range. Then, as an uplink's health degrades, applications in the least critical class would migrate when the health degrades 30% from baseline, and applications in the more critical class would migrate when the health degrades 80% from baseline. Often, uplink health degrades due to a number of factors, including increased data traffic from various applications. By migrating non-critical applications, a critical application may be able to remain on a degraded uplink rather than dealing with the consequences of migrating the critical application. As should be apparent from the disclosure, there are multiple ways in which applications can be selected for migration and migrated, all consistent with this disclosure.

FIG. 1 illustrates an example software defined wide area network with a pair of wide area network (WAN) uplinks. SD-WAN 100 includes branch gateway (GW) 102, branch LAN 104, WAN 106, client devices 108a-c, and WAN uplinks 110a-b. Client devices 108a-c transceive data relating to applications 112a-c, which are transported via WAN uplinks 110a-b.

In some examples, GW 102 is a network controller including network flows configured by a network orchestrator. The network orchestrator may be a cloud-hosted service. In some examples, DPS decision making is executed by GW 102. In some other examples, relevant information is transmitted from GW 102 to the network orchestrator, and flow alterations executing DPS changes to routing are generated at and received from the network orchestrator and implemented at GW 102. Generally, execution of features of this disclosure is not limited to a specific hardware device or component. In the examples relating to FIG. 1, execution of features are described as occurring on GW 102 for clarity's sake. Similarly, certain features of this disclosure are described as generating a result. In some examples, results generated by a feature may be updated by the feature using additionally gathered information.

When GW 102 receives a network message (e.g. a packet) that does not match flow criteria of any existing flows, GW 102 may determine information about the application 112a represented by the new network message. For example, information may include amount of data being transceived, number of users using the application, packet-specific characteristics, type of application, and reputation of applications. Certain types of information may not be immediately available upon receipt of an initial packet, so information may be updated as additional data traffic for the application is transceived. Some information may be directly gathered by GW 102, some information may be requested from and received from the network orchestrator, and some information may be requested from and received from an analytics service. From this information, various application criticality factors may be selected and/or derived. As an example, an average packet size may be calculated on a continuous basis by updating the factor each time a new packet for the flow is received.

Using the determined information, GW 102 categorizes (i.e. classifies) the application into a criticality class. In some examples, a classification algorithm is used to heuristically categorize the application into the appropriate criticality class. In certain examples, the application is classified into a criticality class for each uplink. In some other examples, the application is classified into a criticality class only for the uplink to which it is initially transceiving data. There may be any number (two or more) of criticality classes for a particular uplink. Each application 112 of the set of applications transceiving data through a certain WAN uplink 110a is categorized into a criticality class of the WAN uplink 110a through one of two processes. Either a network administrator manually assigns application 112 to a criticality class, or the classification algorithm heuristically assigns application 112 to a criticality class.

For example, application 112a may be classified into a most critical class based on application criticality factors gathered by GW 102 and analyzed by the classification algorithm, application 112b may be classified into a most critical class based on a network administrator placing application 112b on a "critical applications" list, and application 112c may be classified into a less critical class based on application criticality factors gathered by GW 102 and analyzed by the classification algorithm. In the example, the level to which pre-configuration of the classification algorithm impacts the classification of applications 112a and 112c is dependent on the specific implementation of the algorithm. In some examples, a network administrator may pre-configure a number of criticality classes, thresholds for each class, etc. In some other examples, the classification algorithm is able to generate a number of criticality classes (in some examples, constrained between numerical limits) and dynamically adjust thresholds for each class based on application criticality factors from various applications 112.

In some examples, categorization of the set of applications is a one-time-per-application event, and an application cannot move between criticality classes without network administrator intervention. In some other examples, categorization is executed on a regular basis, accounting for new and updated application criticality factors, new applications, and intervening application migrations.

GW 102 may then determine a maximum threshold for health of WAN Uplink 110a. As described in this disclosure, "maximum", "more" and other positively directed descriptions of uplink health refer to increases in negatively correlated health parameters, thus indicating deterioration of the health of the uplink. "Minimum", "less", and other negatively directed descriptions of uplink health refer to decreases in negatively correlated health parameters, thus indicating improvement in the health of the uplink. Therefore, the maximum threshold represents the worst degradation of WAN Uplink 110a before critical applications 112a-b are migrated to WAN Uplink 110b. The maximum health threshold is determined by selecting, across critical application SLAs, minimum values for each health parameter. As shown below, Table 1 illustrates an example selection of a maximum health threshold.

TABLE 1

| Critical Application | Bandwidth Utilization (%) | Jitter (ms) | Latency (ms) | Packet Loss (%) |
|---|---|---|---|---|
| A | 80 | 150 | 3000 | 0.9 |
| B | 84 | 200 | 3500 | 0.5 |
| C | 76 | 250 | 4000 | 0.7 |
| D | 47 | 170 | 800 | 0.8 |
| E | 30 | 180 | 600 | 0.2 |
| F | 36 | 190 | 1000 | 1 |

Table 1 shows a set of example critical applications along with parameters of each application's SLA. For example, critical application A has a SLA of 80% or less bandwidth utilization, 150 ms or less jitter, 3000 ms or less latency, and 0.9% or less packet loss. To determine the maximum health threshold, a minimum of each parameter is selected from the critical application SLAs. In the example of Table 1, the maximum health threshold is 30% or less bandwidth utilization, 150 ms or less jitter, 600 ms or less latency, and 0.2% or less packet loss. This maximum health threshold represents a level of uplink degradation where critical applications begin to migrate away from the uplink. This assumes that critical applications migrate when any parameter of their SLA is exceeded. As would be apparent to a person having ordinary skill in the art, the maximum health threshold would be determined differently if critical application migration occurs on a trigger other than the "any parameter" trigger.

Although the maximum health threshold is described above as being calculated in relation to "critical applications", the calculation is not restricted to a single most critical class. Rather, GW 102 can be configured to determine a maximum health threshold from any set of critical applications, whether they be in a single criticality class or across multiple criticality classes.

An operating range for non-critical applications may then be established by determining a baseline health threshold. The baseline health threshold is a minimum of the operating range and the maximum health threshold is a maximum of the operating range. GW 102 gathers information about the WAN uplink 110*a* over a period of time (e.g. longitudinal data) and calculates a threshold for each uplink health parameter. An example algorithm for calculating the baseline health threshold is a one-class support vector machine. The baseline is calculated by focusing on the common behavior of the parameter in question and ignoring outliers to determine a common operation baseline value for the parameter. Another example algorithm includes filtering outlier data (e.g. >+/−2 standard deviations) and determining a mean value of the inlier data for the parameter.

Once the baseline health threshold is determined, the non-critical application operating range for WAN uplink 110*a* is defined. Within this operating range, non-critical applications 112*c* can transceive data across WAN uplink 110*a* without causing critical applications 112*a-b* to migrate to WAN uplink 110*b*. However, merely setting the SLA for non-critical application 112*c* to the maximum health threshold would result in degradation of WAN uplink 110*a* causing migration of application 112*c* followed quickly by migration of critical applications 112*a-b*. Degradation of a WAN uplink 110*a* is not usually monotonic, slow, and predictable. Often, WAN uplink health degradation is noisy and bursty. Certain precautions can be taken to mitigate some of the noise and burstiness, such as requiring an SLA to be violated for a certain duration before migrating the application. However, the potential that there is no gap between the maximum health threshold and SLA violations for critical applications 112*a-b* makes the maximum health threshold a poor candidate for non-critical application 112*c* SLA. Rather, a more suitable SLA for non-critical application 112*c* is a value somewhere within the non-critical application operating range. That way, when degradation of WAN uplink 110*a* increases, non-critical application 112*c* is migrated before critical applications 112*a-b* are in danger of having their SLAs violated. Often, moving a non-critical application 112*c* can free up enough uplink resources to delay or prevent migration of critical applications 112*a-b*.

To determine the SLA for non-critical application 112*c*, a migration factor is calculated for the criticality class including non-critical application 112*c*. In some examples, each non-critical application has an independently calculated migration factor. In some other examples, each non-critical application inherits its migration factor from its criticality class. In yet other examples, some non-critical applications have independently calculated or manually configured migration factors and other non-critical applications inherit their migration factors from their respective criticality classes. As previously mentioned, the classification algorithm may be more thoroughly pre-configured, and thus migration factors may be configured by a network administrator for each criticality class and for any independent non-critical applications. In other examples, the classification algorithm may be less thoroughly pre-configured, and thus migration factors may be calculated by the algorithm dependent on a determination of relative criticality. For example, the classification algorithm may assign a criticality score between 0.00 and 1.00 to each application, and the criticality score may be used as the migration factor for the application.

As mentioned above, the behavior in regards to critical applications and non-critical applications can be different in some examples, and the terms "critical" and "non-critical" may be defined one of many ways in various examples. In the following example, for the sake of simplicity, two criticality classes exist, a critical class and a non-critical class. The critical class includes critical applications, such as applications 112.*a-b*. The non-critical class includes non-critical applications, such as application 112*c*. Applications of the critical class have SLAs defined by a network administrator or by other means. Applications of the non-critical class have SLAs defined using migration thresholds calculated based on the maximum health threshold, the baseline health threshold, and the migration factor of the respective criticality class.

For example if the non-critical class has a migration factor of 0.65, the migration threshold of each uplink health parameter of application 112*c*'s SLA would be 65% of the non-critical application operating range. The migration threshold of a parameter may be calculated using formula 2.

$$Tm = Tb + (Th - Tb) * Fm \qquad \text{Formula 2}$$

In formula 2, the migration threshold for a parameter (Tm) is calculated by the sum of the baseline health threshold (Tb) with the difference of the maximum health threshold (Th) and the baseline health threshold (Tb) multiplied by the migration factor (Fm). Although the algorithm described in formula 2 is not the only way to determine a migration threshold for a parameter, formula 2 generates a migration threshold that is a percentage of the non-critical application operating range based on the migration factor. In some examples, each criticality class, including for critical applications, has a migration threshold calculated. In some other examples, only non-critical classes have a migration threshold calculated.

With migration thresholds set, WAN uplink 110*a* is monitored to detect when a migration threshold is breached. In some examples, the uplink health must cross an additional critical application proximity threshold before non-critical applications begin to be migrated. For example, no applications will be migrated until the uplink health degrades to 45% of the operating range. In other examples, health information is periodically collected from WAN uplink 110*a*, and it is determined whether a migration threshold of a criticality class has been breached. For example, if the non-critical class including application 112*c* has a migration threshold of 30% of the operating range, and the measured uplink health is 38% of the operating range, then GW 102 determines that the migration threshold of the non-critical class has been breached. As mentioned above, certain noise abatement requirements may need to be satisfied (e.g. duration beyond the threshold, magnitude beyond the threshold, etc.) prior to GW 102 determining that the threshold has been breached.

In some examples, once it has been determined that application 112*c*'s migration threshold has been breached, GW 102 migrates application 112*c* from WAN uplink 110*a* to WAN uplink 110*b*. In some examples, migrating an application 112 causes previously calculated thresholds to be updated. In some other examples, previously calculated thresholds are not updated. In some other examples, previously calculated thresholds are updated independent from the migration of an application 112.

Figure 2:
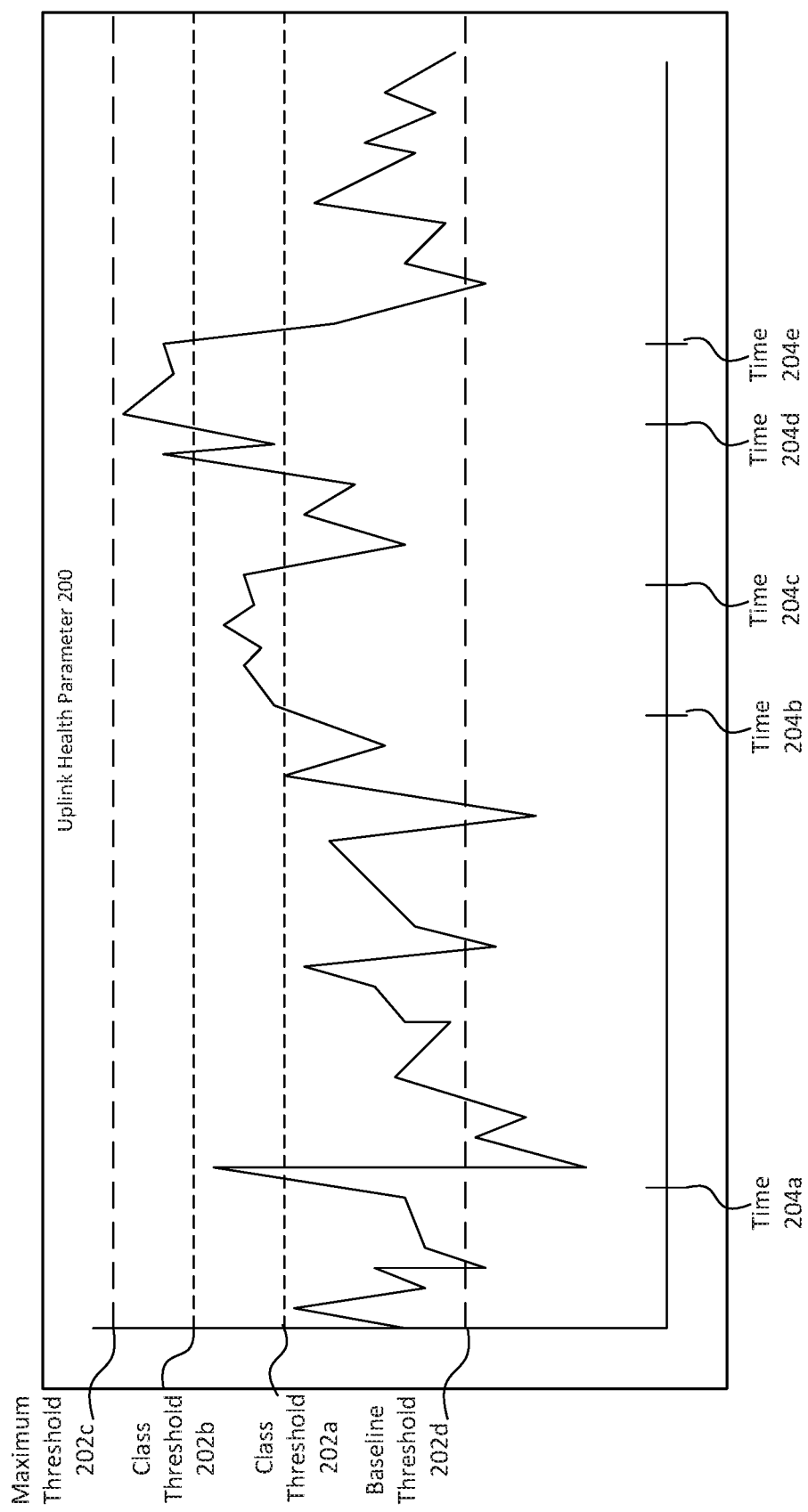
FIG. 2 is a chart illustrating an example uplink health parameter over time.

FIG. 2 is a chart illustrating an example uplink health parameter over time. Uplink health parameter 200 may be a parameter such as jitter, latency, bandwidth usage, packet loss, or another uplink health parameter. Thresholds 202*a-d* include a baseline threshold 202*d*, a maximum threshold 202*c*, and a pair of class thresholds 202*a* (approximately 50% of the operating range) and 202*b* (approximately 75% of the operating range).

In common operating conditions, parameter 200 stays in the area around baseline threshold 202*d*. However, at certain times, parameter 200 increases from baseline threshold 202*d*. At time 204*a*, parameter 200 "blips" above class threshold 202*a*. However, since the parameter only exceeds threshold 202*a* for a short duration, no applications are migrated to a different uplink. At time 204*b*, parameter 200 exceeds threshold 202*a* for a longer duration, resulting in applications of the criticality class associated with class threshold 202*a* to migrate to another uplink. Resultantly, at time 204*c*, parameter 200 reduces due to the reduced load on the uplink. However, the reduction is not long lasting, as at time 204*d*, parameter 200 exceeds class threshold 202*b* for a longer duration. Parameter 200 also exceeds class threshold 202*a*, but since applications associated with threshold 202*a* have already been migrated, it does not matter that threshold 202*a* has been exceeded unless new applications have been added to the corresponding criticality class. Upon parameter 200 exceeding threshold 202*b*, another set of applications (associated with threshold 202*b*) are migrated to another uplink. This migration results in a reduction in parameter 200 at time 204*e*. The migration at time 204*d* causes parameter 200 to return close to baseline threshold 202*d*. Notably, at no time did parameter 200 exceed maximum threshold 202*c*, and thus no critical applications were migrated to another uplink. While this is not guaranteed behavior, migration of non-critical applications first reduces the likelihood of critical applications being migrated to another uplink.

Figure 3:
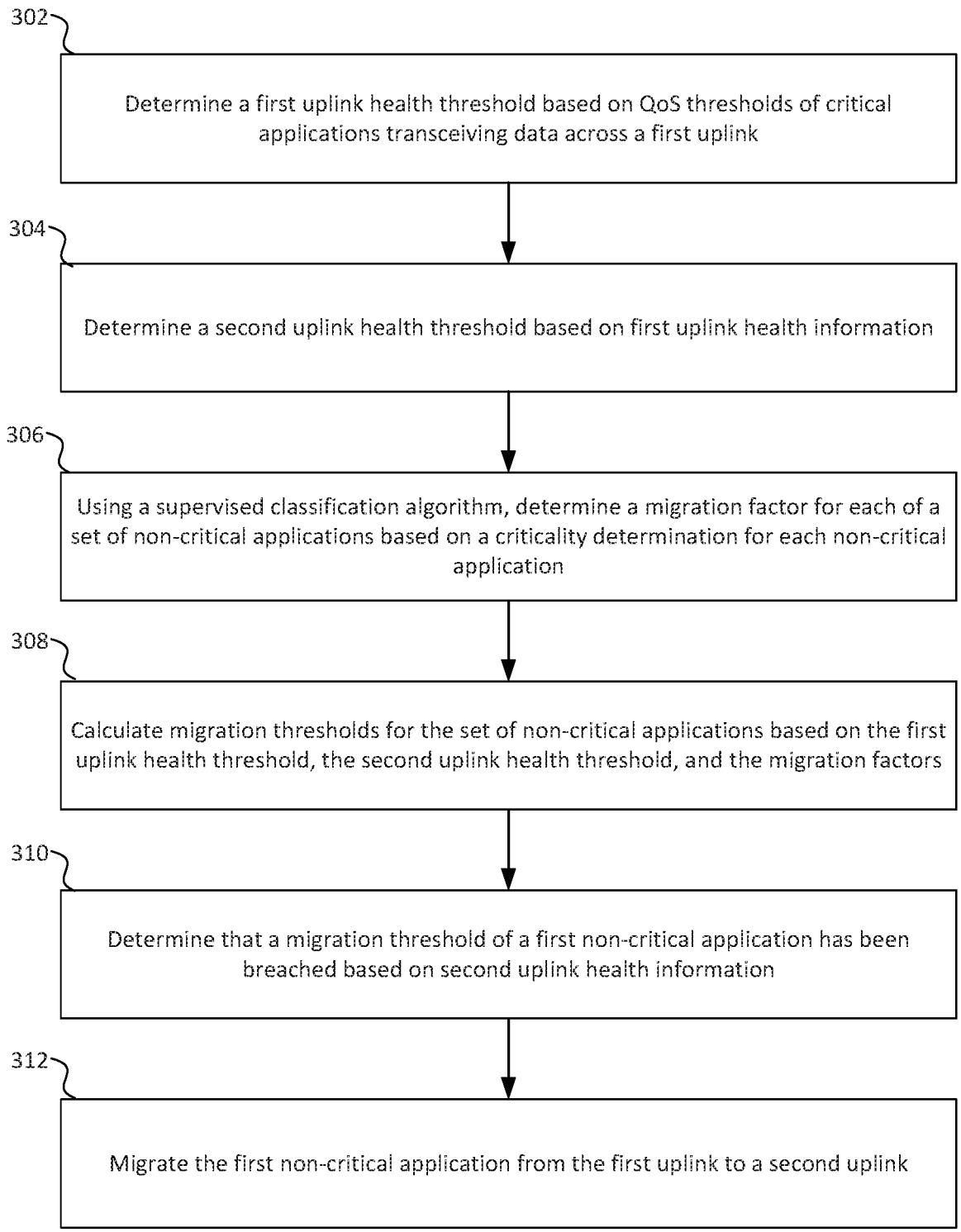
FIG. 3 is a flowchart illustrating an example method for migrating applications between uplinks.

FIG. 3 is a flowchart illustrating an example method for migrating applications between uplinks. Method 300 may be stored as instructions in a memory and executed by processing circuitry of a branch gateway. In some examples, some blocks of method 300 are executed by a network orchestrator and other blocks of method 300 are executed by a branch gateway. In some other examples, all blocks of method 300 are executed by a network orchestrator or a branch gateway, and certain information required to execute the blocks of method 300 may be received from other devices of the network.

In block 302, a first uplink health threshold is determined based on QoS thresholds of one or more critical applications transceiving data across a first uplink of a branch gateway. In some examples, a set of applications transceiving data across the first uplink have previously been categorized into a set of criticality classes based on respective application criticality factors. The first uplink threshold may be a maximum threshold for non-critical applications transceiving data across the first uplink. In certain examples, the first uplink health threshold is determined by selecting a minimum value across the SLAs of the one or more critical applications for each health parameter of the SLAs. Table 1 and its associated description shows how these certain examples may operate.

In block 304, a second uplink health threshold is determined based on first uplink health information. In some examples, the first uplink health information is longitudinal information collected from the first uplink that is used to determine the typical operation of the first uplink. The first uplink health information may include parameters such as jitter, latency, packet loss, and bandwidth utilization. The second uplink health threshold may be a baseline health value for the first uplink, and may be used as a baseline minimum threshold for non-critical applications transceiving data across the first uplink. In some examples, the second uplink health threshold is calculated using a one-class support vector machine. Some outlier data may be filtered from the first uplink health information prior to determining baseline values.

In block 306, a migration factor is determined for each of a set of non-critical applications using a supervised classification algorithm. The migration factor is determined based, in part, on a criticality determination for each non-critical application. In some examples, each non-critical application inherits its migration factor from its respective criticality class. In such examples, each criticality class may have its migration factor manually configured by a network administrator or calculated during categorization of the applications. In some other examples, some or all of the non-critical applications have their migration factors determined independently of their criticality classes. For example, an unsupervised classification algorithm may provide a criticality score for each non-critical applications that is used as a migration factor. In another example, a network administrator may manually configure a migration factor for certain applications.

In block 308, migration thresholds are calculated for the set of non-critical applications based on the first uplink health threshold, the second uplink health threshold, and the migration factors. In some examples, the first uplink health threshold and the second uplink health threshold respectively define maximum and minimum values of a non-critical application operating range, and the migration threshold for each non-critical application is a value within the operating range (between the first uplink health threshold and the second uplink health threshold). In certain examples, the migration factor determines where in the operating range (as a percentage value) the migration threshold for the respective application falls. For example, an application with a 0.35 migration factor has a migration threshold at 35% of the operating range.

In block 310, it is determined that a migration threshold of a first non-critical application has been breached. This determination is based on second uplink health information. The second uplink health information includes parameters (e.g. jitter, latency, bandwidth usage, packet loss, etc.) of the first uplink and is regularly monitored. The second uplink health information is compared to the migration thresholds (SLAs) of each non-critical application, as well as the SLAs of each critical application. In some examples, certain noise filtering is done prior to determining that a breach of an SLA has occurred. For example, it may be required that a migration threshold be surpassed for a certain duration before the SLA is considered breached.

In block 312, the first non-critical application is migrated from the first uplink to the second uplink. In some examples, the migration process may include additional actions, such as purging a cache, removing data from memory, informing the application of the migration, informing network peers of the migration, severing network connections, etc.

Figure 4:
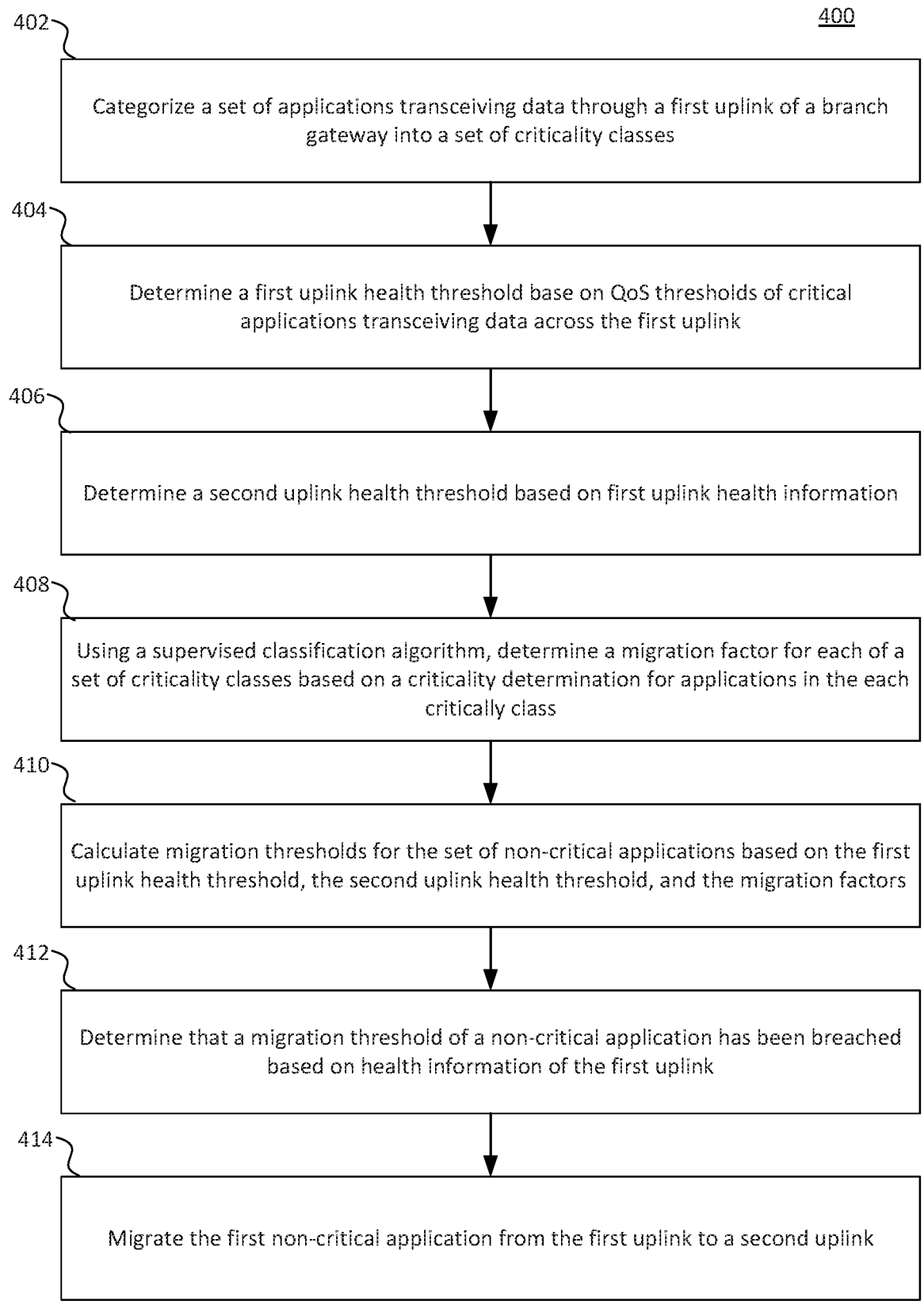
FIG. 4 is a flowchart illustrating another example method for migration applications between uplinks.

FIG. 4 is a flowchart illustrating another example method for migration applications between uplinks. Method 400 may be stored as instructions in a memory and executed by processing circuitry of a branch gateway. In some examples, some blocks of method 400 are executed by a network orchestrator and other blocks of method 400 are executed by a branch gateway. In some other examples, all blocks of method 400 are executed by a network orchestrator or a branch gateway, and certain information required to execute the blocks of method 400 may be received from other devices of the network.

In block 402, a set of applications transceiving data across a first uplink of a branch gateway are categorized into a set of criticality classes. In some examples, the applications are categorized based on respective application criticality factors.

In block 404, a first uplink health threshold is determined based on QoS thresholds of one or more critical applications transceiving data across a first uplink of a branch gateway. The first uplink threshold may be a maximum threshold for non-critical applications transceiving data across the first uplink. In certain examples, the first uplink health threshold is determined by selecting a minimum value across the SLAs of the one or more critical applications for each health parameter of the SLAs. Table 1 and its associated description shows how these certain examples may operate.

In block 406, a second uplink health threshold is determined based on first uplink health information. In some examples, the first uplink health information is longitudinal information collected from the first uplink that is used to determine the typical operation of the first uplink. The first uplink health information may include parameters such as jitter, latency, packet loss, and bandwidth utilization. The second uplink health threshold may be a baseline health value for the first uplink, and may be used as a baseline minimum threshold for non-critical applications transceiving data across the first uplink. In some examples, the second uplink health threshold is calculated using a one-class support vector machine. Some outlier data may be filtered from the first uplink health information prior to determining baseline values.

In block 408, a migration factor is determined for each of a set of criticality classes using a supervised classification algorithm. The migration factor is determined based, in part, on a criticality determination for each criticality class. In some examples, each non-critical application inherits the migration factor from its respective criticality class. In such examples, each criticality class may have its migration factor manually configured by a network administrator or calculated during categorization of the application. In some other examples, some or all of the non-critical applications have their migration factors determined independently of their criticality classes. For example, an unsupervised classification algorithm may provide a criticality score for each non-critical applications that is used as a migration factor. In another example, a network administrator may manually configure a migration factor for certain applications.

In block 410, migration thresholds are calculated for the set of non-critical applications based on the first uplink health threshold, the second uplink health threshold, and the migration factors. In some examples, the first uplink health threshold and the second uplink health threshold respectively define maximum and minimum values of a non-critical application operating range, and the migration threshold for each non-critical application is a value within the operating range (between the first uplink health threshold and the second uplink health threshold). In certain examples, the migration factor determines where in the operating range (as a percentage value) the migration threshold for the respective application falls. For example, an application with a 0.35 migration factor has a migration threshold at 35% of the operating range.

In block 412, it is determined that a migration threshold of a first non-critical application has been breached. This determination is based on health information of the first uplink. In some examples, health information of the first uplink is collected on a periodic basis, and the health information is then compared to the migration thresholds of applications. The second uplink health information includes parameters (e.g. jitter, latency, bandwidth usage, packet loss, etc.) of the first uplink and is regularly monitored. The second uplink health information is compared to the migration thresholds (SLAs) of each non-critical application, as well as the SLAs of each critical application. In some examples, certain noise filtering is done prior to determining that a breach of an SLA has occurred. For example, it may be required that a migration threshold be surpassed for a certain duration before the SLA is considered breached. In certain examples, the health information of the first uplink is compared to a migration threshold of a criticality class rather than to individual applications. In such examples, all applications of the criticality class may be considered to have breached SLAs when the migration threshold of the criticality class is breached.

In block 414, the first non-critical application is migrated from the first uplink to the second uplink. In certain examples, the migration occurs upon determining that the migration threshold of the first non-critical application has been breached. In some examples, the migration process may include additional actions, such as purging a cache, removing data from memory, informing the application of the migration, informing network peers of the migration, severing network connections, etc. In some examples where health information of the first uplink is compared to migration thresholds of criticality classes, every application of a breached criticality class is migrated. In other such examples, characteristics of the breach (magnitude of breach, duration of breach, frequency of breach, etc.) may be used to determine which applications of the criticality class are migrated and which are not.

Figure 5:
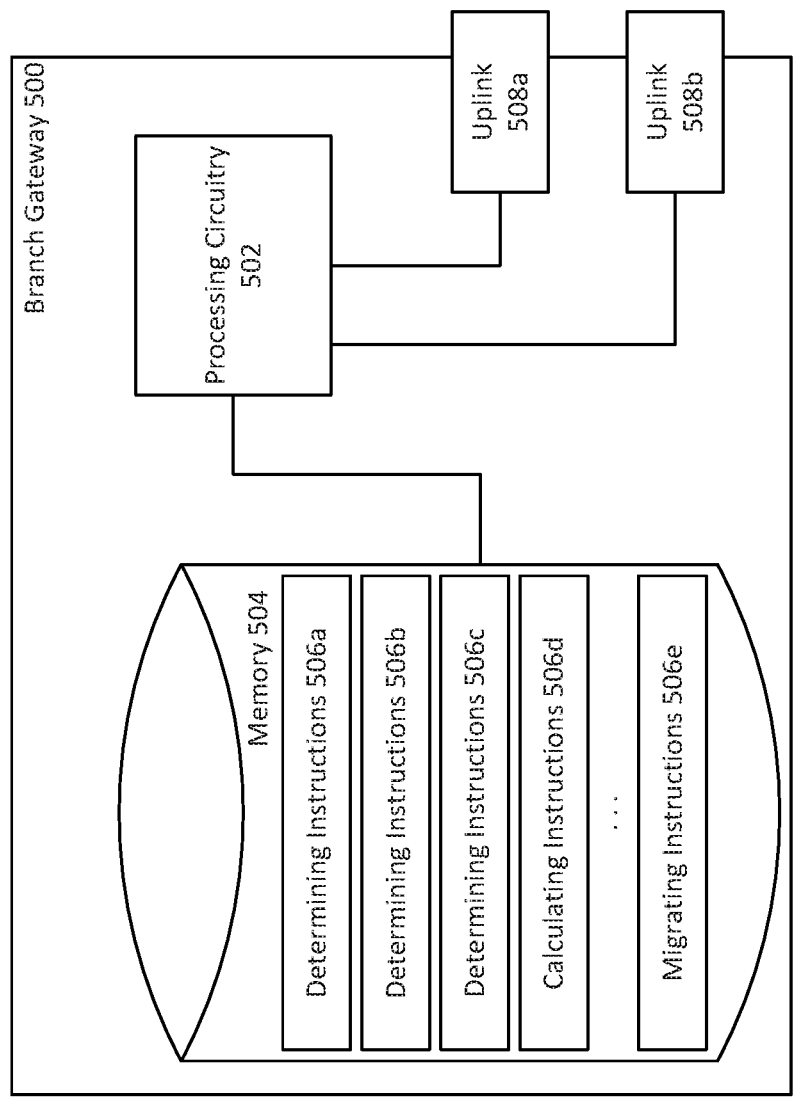
FIG. 5 illustrates an example branch gateway executing instructions to migrate applications between uplinks.

FIG. 5 illustrates an example branch gateway executing instructions to migrate applications between uplinks. Branch gateway 500 includes processing circuitry 502, memory 504 including instructions 506a-e, and uplinks 508a-b. Features of this disclosure may, in some examples, be encoded as instructions 506 in memory 504 and executed on processing circuitry 502 to cause branch gateway 500 to perform such features.

When instructions 506a are executed, a first uplink health threshold is determined for uplink 508a based on QoS thresholds of one or more critical applications transceiving data across uplink 508a. In some examples, a set of applications transceiving data across uplink 508a have previously been categorized into a set of criticality classes based on respective application criticality factors. The first uplink threshold may be a maximum threshold for non-critical applications transceiving data across uplink 508a. In certain examples, the first uplink health threshold is determined by selecting a minimum value across the SLAs of the one or more critical applications for each health parameter of the SLAs. Table 1 and its associated description shows how these certain examples may operate.

When instructions 506b are executed, a second uplink health threshold is determined based on health information for uplink 508a. In some examples, the health information is longitudinal information collected from uplink 508a that is used to determine the typical operation of uplink 508a. The health information may include parameters such as jitter, latency, packet loss, and bandwidth utilization. The second uplink health threshold may be a baseline health value for uplink 508a, and may be used as a baseline minimum threshold for non-critical applications transceiving data across uplink 508a. In some examples, the second uplink health threshold is calculated using a one-class support vector machine. Some outlier data may be filtered from the health information prior to determining baseline values.

When instructions 506b are executed, a migration factor is determined for each of a set of non-critical applications using a supervised classification algorithm. The migration factor is determined based, in part, on a criticality determination for each non-critical application. In some examples, each non-critical application inherits its migration factor from its respective criticality class. In such examples, each criticality class may have its migration factor manually configured by a network administrator or calculated during categorization of the applications. In some other examples, some or all of the non-critical applications have their migration factors determined independently of their criticality classes. For example, an unsupervised classification algorithm may provide a criticality score for each non-critical applications that is used as a migration factor. In another example, a network administrator may manually configure a migration factor for certain applications.

When instructions 506d are executed, migration thresholds are calculated for the set of non-critical applications based on the first uplink health threshold, the second uplink health threshold, and the migration factors. In some examples, the first uplink health threshold and the second uplink health threshold respectively define maximum and minimum values of a non-critical application operating range, and the migration threshold for each non-critical application is a value within the operating range (between the first uplink health threshold and the second uplink health threshold). In certain examples, the migration factor determines where in the operating range (as a percentage value) the migration threshold for the respective application falls. For example, an application with a 0.35 migration factor has a migration threshold at 35% of the operating range.

In some examples, certain additional instructions (not shown) are executed and determine that a migration threshold of a first non-critical application has been breached. This determination is based on second health information from uplink 508a. The second health information includes parameters (e.g. jitter, latency, bandwidth usage, packet loss, etc.) of uplink 508a and is regularly monitored. The second health information is compared to the migration thresholds (SLAs) of each non-critical application, as well as the SLAs of each critical application. In some examples, certain noise filtering is done prior to determining that a breach of an HA has occurred. For example, it may be required that a migration threshold be surpassed for a certain duration before the SLA is considered breached.

When instructions 506e are executed, the first non-critical application is migrated from uplink 508a to uplink 508b. In some examples, the migration process may include additional actions, such as purging a cache, removing data from memory, informing the application of the migration, informing network peers of the migration, severing network connections, etc. In some examples, prior to migration, it is determined whether uplink 508b has enough free capacity to accept the first non-critical application. In examples where uplink 508b does not have enough free capacity, the first non-critical application may not be migrated to uplink 508b.

Flows are groups of network traffic in a SDN network that are routed based on flow-specific rules. For example, a flow may include all network traffic identified as being related to social media applications. All network traffic that is identified as being related to social media applications may be subject to low quality of service requirements in comparison to video or audio streaming. Further, network traffic in the social media flow may be subject to additional security screening (e.g. firewall), role-based limitations (e.g. only the marketing department has access to social media while on the enterprise network), or other routing preferences.

Routes are paths through a network. Often, "flows" and "routes" are used as near-synonyms. "Flows" encompass one or both of the classification of packets to a flow pattern, as well as the path those classified packets take through the SDN overlay network. "Routes" usually refer to the path those packets take through the physical underlay network.

Branch gateways are network infrastructure devices that are placed at the edge of a branch LAN. Often branch gateways are routers that interface between the LAN and a wider network, whether it be directly to other LANs of the WAN via dedicated network links (e.g. MPLS) or to the other LANs of the WAN via the Internet through links provided by an Internet Service Provider connection. Many branch gateways can establish multiple uplinks to the WAN, both to multiple other LAN sites, and also redundant uplinks to a single other LAN site. Branch gateways also often include network controllers for the branch LAN. In such examples, a branch gateway in use in a SD-WAN may include a network controller that is logically partitioned from an included router. The network controller may control infrastructure devices of the branch LAN, and may receive routing commands from a network orchestrator.

A network orchestrator is a service (e.g. instructions stored in a non-transitory, computer-readable medium and executed by processing circuitry) executed on a computing device that orchestrates switching and routing across a SD-WAN. In some examples, the network orchestrator executes on a computing device in a core site LAN of the SD-WAN. In some other examples, the network orchestrator executes on a cloud computing device. The network orchestrator may be provided to the SD-WAN as a service (aaS). The network orchestrator gathers network operating information from various network infrastructure devices of the SD-WAN, including network traffic load information, network topology information, network usage information, etc. The network orchestrator then transmits commands to various network infrastructure devices of the SD-WAN to alter network topology and network routing in order to achieve various network efficiency and efficacy goals.

A network administrator is a person, network service, or combination thereof that has administrative access to network infrastructure devices and configures devices to conform to a network topology.

A client device is a computing device that is operated or accessed by a network user. Client devices include laptop/desktop computers, tablets/phones/PDAs, servers, Internet of Things devices, sensors, etc.

A network infrastructure device is a device that receives network traffic and forwards the network traffic to a destination. Network infrastructure devices may include, among other devices, controllers, access points, switches, routers, bridges, and gateways. Certain network infrastructure devices may be SDN capable, and thus can receive network commands from a controller or an orchestrator and adjust operation based on the received network commands. Some network infrastructure devices execute packets services, such as application classification and deep packet inspection, on certain network traffic that is received at the network infrastructure device. Some network infrastructure devices monitor load parameters for various physical and logical resources of the network infrastructure device, and report load information to a controller or an orchestrator.

Processing circuitry is circuitry that receives instructions and data and executes the instructions. Processing circuitry may include application specific integrated circuits (ASICs), field programmable gate arrays (FPGAs), microcontrollers (uCs), central processing units (CPUs), graphics processing units (GPUs), microprocessors, or any other appropriate circuitry capable of receiving instructions and data and executing the instructions. Processing circuitry may include one processor or multiple processors. Processing circuitry may include caches. Processing circuitry may interface with other components of a device, including memory, network interfaces, peripheral devices, supporting circuitry, data buses, or any other appropriate component. Processors of a processing circuitry may communicate to one another through shared cache, interprocessor communication, or any other appropriate technology.

Memory is one or more non-transitory computer-readable medium capable of storing instructions and data. Memory may include random access memory (RAM), read only memory (ROM), processor cache, removable media (e.g. CD-ROM, USB Flash Drive), storage drives (e.g. hard drive (HDD), solid state drive (SSD)), network storage (e.g. network attached storage (NAS)), and/or cloud storage. In this disclosure, unless otherwise specified, all references to memory, and to instructions and data stored in memory, can refer to instructions and data stored in any non-transitory computer-readable medium capable of storing instructions and data or any combination of such non-transitory computer-readable media.

A software defined network (SDN) is a network overlaying a physical network that allows a device, such as a network orchestrator, to dynamically configure the topology of the SDN overlay using flows to specific routes through the underlay physical network. Dynamic configuration can include alterations to the network topology based on many factors, including network health and performance, data type, application type, quality of service restrictions (e.g. service level agreements), device load, available bandwidth, business cost, and other factors.

A software defined wide area network (SD-WAN) is a SDN that controls the interaction of various sites of a WAN. Each site may have one or more LANs, and LANs connect to one another via WAN uplinks. Some WAN uplinks are dedicated lines (e.g. MPLS), and others are shared routes through the Internet (e.g. DSL, TI, LTE, 5G, etc.). An SD-WAN dynamically configures the WAN uplinks and data traffic passing through the WAN uplinks to effectively use the resources of the WAN uplinks.

The features of the present disclosure can be implemented using a variety of specific devices that contain a variety of different technologies and characteristics. As an example, features that include instructions to be executed by processing circuitry may store the instructions in a cache of the processing circuitry, in random access memory (RAM), in hard drive, in a removable drive (e.g. CD-ROM), in a field programmable gate array (FPGA), in read only memory (ROM), or in any other non-transitory, computer-readable medium, as is appropriate to the specific device and the specific example implementation. As would be clear to a person having ordinary skill in the art, the features of the present disclosure are not altered by the technology, whether known or as yet unknown, and the characteristics of specific devices the features are implemented on. Any modifications or alterations that would be required to implement the features of the present disclosure on a specific device or in a specific example would be obvious to a person having ordinary skill in the relevant art.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

The invention claimed is:

1. A branch gateway, comprising:
   processing circuitry; and
   a memory including instructions that, when executed on the processing circuitry, cause the branch gateway to:
      determine, based on quality of service (QoS) thresholds of one or more critical applications transceiving data across a first uplink, a first uplink health threshold;
      determine, based on first health information of the first uplink, a second uplink health threshold;
      calculate migration thresholds for a set of non-critical applications, each migration threshold based on the first uplink health threshold, the second uplink health threshold, and a migration factor for the respective non-critical application;
      determine, based on second health information of the first uplink, that a QoS threshold of a critical application is likely to be imminently breached;
      select, from the set of non-critical applications, a least critical application, based on the migration threshold of the least critical application; and
      migrate the least critical application from the first uplink to a second uplink.

2. The branch gateway of claim 1, wherein the QoS thresholds, the first health information, and the second health information each include one or more of: jitter, latency, packet loss, or bandwidth utilization.

3. The branch gateway of claim 1, further including instructions that cause the network orchestrator to:
   categorize, using a classification algorithm and based on application criticality factors, a set of applications transceiving data through the first uplink of the branch gateway into a set of criticality classes;
   determine a migration factor for each criticality class based, in part, on a criticality determination for applications in the respective criticality class; and
   determine, based on health information of the first uplink, that a migration threshold of a first criticality class has been breached.

4. The branch gateway of claim 3, wherein the migration factor for each criticality class is applied to applications of the respective criticality class.

5. The branch gateway of claim 1, wherein the first uplink health threshold is a minimum threshold across the one or more critical applications.

6. The branch gateway of claim 1, wherein the first health information is longitudinal information of typical operation of the first uplink.

7. The branch gateway of claim 1, wherein the first uplink health threshold is a maximum threshold for non-critical applications, and wherein the second uplink health threshold is a baseline minimum threshold for non-critical applications.

8. The branch gateway of claim 7, wherein each migration threshold for the non-critical applications is a value between the first uplink health threshold and the second uplink health threshold.

9. A method, comprising:
  determining, using a classification algorithm and based on quality of service (QoS) thresholds of one or more critical applications transceiving data across a first uplink, a first uplink health threshold;
  determining, based on first uplink health information, a second uplink health threshold;
  calculating a migration factor for each of a set of non-critical applications based, in part, on a criticality determination for each non-critical application;
  calculating migration thresholds for the set of non-critical applications, each migration threshold based on the first uplink health threshold, the second uplink health threshold, and the migration factor for the respective non-critical application;
  determining, based on second uplink health information, that a migration threshold of a first non-critical application has been breached; and
  migrating the first non-critical application from the first uplink to a second uplink.

10. The method of claim 9, further comprising:
  categorizing, based on application criticality factors, a set of applications transceiving data across a first uplink of a branch gateway into a set of criticality classes.

11. The method of claim 10, wherein a migration factor for each criticality class is applied to applications of the respective criticality class.

12. The method of claim 9, wherein the QoS thresholds, the first uplink health information, and the second uplink health information each include one or more of: jitter, latency, packet loss, or bandwidth utilization.

13. The method of claim 9, wherein the first uplink health threshold is a minimum threshold across the one or more critical applications.

14. The method of claim 9, wherein the first health information is longitudinal information of typical operation of the first uplink.

15. The method of claim 9, wherein the first uplink health threshold is a maximum threshold for non-critical applications, and wherein the second uplink health threshold is a baseline minimum threshold for non-critical applications.

16. The method of claim 15, wherein each migration threshold for the non-critical applications is a value between the first uplink health threshold and the second uplink health threshold.

17. A non-transitory, computer readable medium including instructions that, when executed on processing circuitry, cause a device to:
  categorize, based on application criticality factors, a set of applications transceiving data through a first uplink of a branch gateway into a set of criticality classes;
  determine, using a classification algorithm and based on quality of service (QoS) thresholds of applications of a most critical criticality class, a first health threshold;
  determine, based on an uplink health baseline for the first uplink, a second health threshold;
  calculate a migration factor for each criticality class based, in part, on a criticality determination for applications in the respective criticality class;
  calculate migration thresholds for applications of each criticality class, each migration threshold based on the first health threshold, the second health threshold, and the migration factor for the respective criticality class;
  determine, based on health information of the first uplink, that a migration threshold of a first criticality class has been breached; and
  upon determining that the migration threshold of the first criticality class has been breached, migrate applications of the first criticality class from the first uplink to a second uplink.

18. The computer readable medium of claim 17, wherein the QoS thresholds, the first uplink health baseline, and the health information each include one or more of: jitter, latency, packet loss, or bandwidth utilization.

19. The computer readable medium of claim 17, wherein the first health threshold is a maximum threshold for non-critical applications, and wherein the second health threshold is a baseline minimum threshold for non-critical applications.

20. The computer readable medium of claim 19, wherein each migration threshold for the non-critical applications is a value between the first health threshold and the second health threshold.

* * * * *